United States Patent
Kabiljo et al.

(10) Patent No.: US 10,313,457 B2
(45) Date of Patent: Jun. 4, 2019

(54) COLLABORATIVE FILTERING IN DIRECTED GRAPH

(71) Applicant: Facebook, Inc., Menlo Park, CA (US)

(72) Inventors: Maja Kabiljo, Menlo Park, CA (US); Aleksandar Ilic, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 628 days.

(21) Appl. No.: 14/718,391

(22) Filed: May 21, 2015

(65) Prior Publication Data

US 2016/0342899 A1 Nov. 24, 2016

(51) Int. Cl.
  *G06N 5/00* (2006.01)
  *H04L 29/08* (2006.01)
  *G06Q 50/00* (2012.01)
  *G06N 20/00* (2019.01)

(52) U.S. Cl.
  CPC ............ *H04L 67/22* (2013.01); *G06N 5/003* (2013.01); *G06N 20/00* (2019.01); *G06Q 50/01* (2013.01)

(58) Field of Classification Search
  CPC ........ H04L 67/22; G06Q 50/01; G06N 5/003; G06N 99/005
  See application file for complete search history.

(56) References Cited

U.S. PATENT DOCUMENTS

2013/0268595 A1* 10/2013 Mohan ............ H04L 51/32
  709/204
2014/0156826 A1* 6/2014 Chang ............ H04L 45/12
  709/224

OTHER PUBLICATIONS

Teflioudi, Christina, Faraz Makari, and Rainer Gemulla. "Distributed matrix completion." In Data Mining (ICDM), 2012 IEEE 12th International Conference on, pp. 655-664. IEEE, 2012.*
Zha, Hongyuan, et al. "Bipartite graph partitioning and data clustering." Proceedings of the tenth international conference on Information and knowledge management. ACM, 2001.*

* cited by examiner

*Primary Examiner* — Li B. Zhen
*Assistant Examiner* — Daniel T Pellett
(74) *Attorney, Agent, or Firm* — FisherBroyles, LLP (57) ABSTRACT

Embodiments are disclosed for data computation of collaborative filtering in a social network. Collaborative filtering involves predicting a user's behavior or interests based on other users' behavior or interests. To predict a user's interests in an item such as a picture, a system performs an iterative computation to perform an evaluation by solving an objective function. The system characterizes "users" as "vertices" in a directed graph, "relationship among users" as "edges" in the directed graph, and "items" as "worker data" that is locally-calculated, stored, and managed in individual worker computers. When a local computing process is completed, the "worker data" can be transferred to other worker computers so as to complete a whole computing process. The system enhances an overall computing efficiency and enables collaborative filtering across a large data set.

20 Claims, 8 Drawing Sheets

FIG. 1

|        | Item 1 | Item 2 | Item 3 | Item 4 | Item 5 |
|--------|--------|--------|--------|--------|--------|
| User 1 | 4      | ?      | 4      | 1      | 3      |
| User 2 | 5      | 3      | ?      | 1      | ?      |
| User 3 | ?      | 1      | 2      | 4      | ?      |
| User 4 | 5      | 3      | 4      | ?      | 5      |
| User 5 | 2      | ?      | ?      | 3      | ?      |

COLLABORATIVE FILTERING IN DIRECTED GRAPH

BACKGROUND

Collaborative filtering is utilized as a tool to analyze users' behavior in a social network. The result of the analysis can be used to predict users' behavior (e.g., interests), so as to enable the social network to provide item recommendations (e.g., an item that a user may be interested in, such as a game, a movie, an article, etc.) for its users. Collaborative filtering analysis usually requires a significant amount of computing resources (especially for a social network having a large number of users). Therefore computing efficiency is extremely critical for a social network to provide a timely item-recommendation service to its users.

A directed graph is an abstract data structure that is often used by social networks to represent relationships among various users and items. A typical directed graph is "bipartite" and constituted by more than one node (or vertex) and at least one edge (e.g., a line between nodes). Traditionally, users and items are characterized as "nodes" in a directed graph and their relationships (e.g., a user "likes" a picture) are treated as "edges" in the directed graph. However, the traditional approach can consume a significant amount of computing resources when a large number of computations are involved, such as collaborative filtering analyses or computations for popular items (e.g., items with million users connected thereto). During peak hours (e.g., with high network traffic), high demands of computing resources caused by these analyses can result in system failures, malfunctions, and/or suspension of online services.

BRIEF DESCRIPTION OF THE DRAWINGS

Embodiments disclosed herein may be better understood by referring to the following Detailed Description in conjunction with the accompanying drawings, in which like reference numerals indicate identical or functionally similar elements.

DETAILED DESCRIPTION

Embodiments are disclosed for efficiently performing a collaborative filtering analysis in a directed graph data structure. More particularly, a system in the disclosed embodiments can analyze behavior or preferences of users associated with an organization or a group (e.g., a social network) and further predict a specified user's behavior or preferences. The prediction of the specified user's behavior or preferences can be used to generate an item-recommendation (e.g., a movie that the specified user may be interested in seeing) or provide relevant information (e.g., an online service that the specified user may want to subscribe) to the specified user. Collaborative filtering is based on an assumption that users having similar characters may have similar interests in or preferences to similar "items." In some embodiments, for example, the items can include an image, a video, a picture, an animation, a drawing, an article, a textual object, an advertisement, a hyperlink, an online service, a game, an audio file, etc. For example, the item can be a web page that attracts a large number of users. As another example, the item can be a group (e.g., high school classmates) that includes multiple users of a social network. In another example, the item can be an application (e.g., a game) that can be implemented by social network users.

Performing a collaborative filtering analysis in a social network requires performing an iterative computation or operation among multiple users and items in the social network. Due to a large amount of users and items, the collaborative filtering analysis would consume a significant amount of computing resources. The disclosed system enables multiple computing devices to perform a collaborative filtering analysis in parallel. For example, performing the collaborative filtering analysis in a traditional way may require a computing device that can provide 10000 units of computing resources at one time. The disclosed system can perform the same collaborative filtering analysis by 100 computing devices that can only provide 100 units of computing resources at one time. More particularly, the disclosed system can perform a matrix-factorization or matrix-decomposition task.

The system in accordance with the disclosed embodiments characterizes "users" in the social network as "nodes (or vertices)" in a directed graph and "items" as "worker data" corresponding to (available) computing devices. The "worker data" can be locally calculated, updated, and stored by a local computing device (e.g., a worker's computer). As a result, the system can efficiently utilize all (available) computing devices to perform the collaborative filtering analysis in a distributed manner—performing the computation or operation for nodes/items in individual computing groups, and then "rotating" calculated intermediate results in a cyclic order until all nodes/items have been computed or operated. (Details of the "rotation" are described below with reference to FIGS. 4A-4C.) By characterizing "items" as "worker data" rather than "nodes" in a directed graph, the system can significantly enhance the overall computing efficiency.

More specifically, for example, the system can divide the nodes in the directed graph to multiple computing groups that correspond to multiple computing devices. The system also divides the items to be analyzed to the multiple computing groups. The nodes/items can be divided based on various factors, such as relationships among the nodes/items (e.g., assigning nodes with close relationships to a same group, or assigning items with a same format or attribute to a same group), available computing resources (e.g., assigning more nodes/items to a computing group corresponding to a computing device with more computing resources), locality of data storage devices (e.g., assigning nodes/items that are stored in same physical storages to same computing groups), the total numbers of nodes/items, related data structures, overall system efficiency, and/or other suitable factors.

For example, a social directed graph can have nodes 1-100 and items 1-5000. The system can have three computing groups X, Y, and Z (e.g., each of the computing groups corresponds to a computing device). In some embodiments, the system can randomly assign the nodes and the items into the computing groups. In other embodiments, the system can assign the nodes and the items into the computing groups in a specific way. For example, the system can assign nodes 1-10 and items 4001-5000 to computing group X, nodes 11-50 and items 2001-4000 to computing group Y, and nodes 51-100 and items 1-2000 to computing group Z. In a first round of computation, the system performs an operation (e.g., solving an objective function to reach a solution that can represent an interest level of a user in an item; an example of the solution can be a rating number shown in FIG. 2) between each item and each node in the same computing groups. For example, the operations between nodes and items in computing groups X, Y and Z can be respectively performed in parallel. Once completed, each computing group can generate an intermediate result in form of the "worker data" described above.

Figure 2:
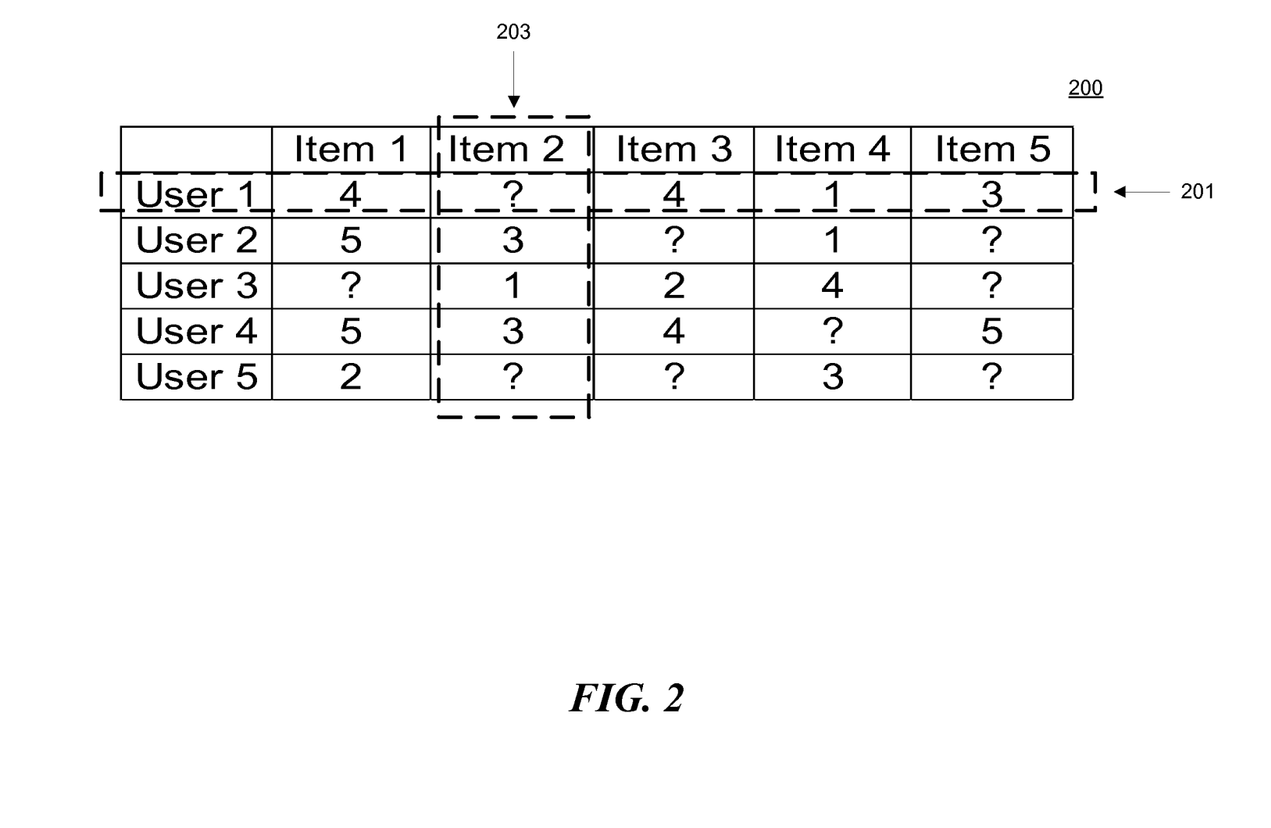
FIG. 2 is a table illustrating a rating number matrix in accordance with various embodiments of the present disclosure.

For example, the intermediate result in computing group X can include a rating number matrix (e.g., an example of the rating number matrix can be found in FIG. 2) that indicates the interest levels of users 1-10 (represented by nodes 1-10) for items 4001-5000 (e.g., a 10×1000 matrix; rating numbers can range from 1-10 showing different levels of interest). Similarly, the intermediate result in computing group Y can include a rating number matrix that indicates the interest levels of users 11-50 (represented by nodes 11-50) for items 2001-4000 (e.g., a 40×2000 matrix), and the intermediate result in computing group Z can include a rating number matrix that indicates the interest levels of users 51-100 (represented by nodes 51-100) for items 1-2000 (e.g., a 50×2000 matrix). The "worker data" or the intermediate results can be stored in corresponding computing devices (e.g., computing devices X, Y, and Z).

After the first round of computation, the system can then "rotate" (or transmit) the "worker data" (or the intermediate result) and the assigned "items" among the computing devices in a cyclic order. The "worker data" contains information associated with updated latent features of the items that were calculated in the first round, together with basic information of the item (e.g., an item degree that is indicative of the complexity of the computations associated with the item). For example, the intermediate result stored in computing device X (and items 4001-5000) can be transmitted to computing device Y, the intermediate result stored in computing device Y (and items 2001-4000) can be transmitted to computing device Z, and the intermediate result stored in computing device Z (and items 1-2000) can be transmitted to computing device X. After the "rotation," the assigned nodes remain in the same computing groups while the intermediates results and the assigned items are transmitted to another computing group. The "rotation" of the intermediate results and items is performed in a form of transmitting "worker messages" among computing devices (e.g., worker's computers), and does not consume a significant amount of computing resources.

The "rotation" changes the items to be operated in the computing groups in the next round of computation. In the next round of computation, the system performs the operation or calculation between "original" nodes and "new" items in the computing groups respectively. The intermediately results can be updated and stored accordingly. The updated intermediate result can include an original portion (which was generated in the last round of computation) and a newly-added portion.

Referring to the same example as discussed above, in a second round of computation, the system can perform the operation between nodes 1-10 and items 1-2000 and generates an updated intermediate result for computing group X. The updated intermediate result in computing group X can include a rating number matrix (e.g., a 10×3000 matrix) with an original portion (e.g., a 10×1000 matrix calculated in the first round) and a newly-added portion that indicates the interest levels of users 1-10 (represented by nodes 1-10) for items 1-2000 (e.g., a 10×2000 matrix). Similarly, the updated intermediate result in computing group Y can include a rating number matrix (e.g., a 40×3000 matrix) with an original portion (e.g., a 40×2000 matrix calculated in the first round) and a newly-added portion that indicates the interest levels of users 11-50 (represented by nodes 11-50) for items 4001-5000 (e.g., a 40×1000 matrix). Similarly, the updated intermediate result in computing group Z can include a rating number matrix (e.g., a 50×4000 matrix) with an original portion (e.g., a 50×2000 matrix calculated in the first round) and a newly-added portion that indicates the interest levels of users 51-100 (represented by nodes 51-100) for items 2001-4000 (e.g., a 50×2000 matrix).

The system can then repeat the computation and rotation process discussed above until the operations or calculations for all the nodes and items in the computing groups are completed. Using the same example as discussed above, in a third round of computation, the system can perform the operation between nodes 1-10 and items 2001-4000 and generate an updated intermediate result for computing group X. The updated intermediate result in computing group X can include a rating number matrix (e.g., a 10×5000 matrix) with an original portion (e.g., a 10×3000 matrix generated in the first and second rounds) and a newly-added portion that indicates the interest levels of users 1-10 (represented by nodes 1-10) for items 2001-4000 (e.g., a 10×2000 matrix). Similarly, the updated intermediate result in computing group Y can include a rating number matrix (e.g., a 40×5000 matrix) with an original portion (e.g., a 40×3000 matrix generated in the first and second rounds) and a newly-added portion that indicates the interest levels of users 11-50 (represented by nodes 11-50) for items 1-2000 (e.g., a 40×2000 matrix). Similarly, the updated intermediate result in computing group Z can include a rating number matrix (e.g., a 50×5000 matrix) with an original portion (e.g., a 50×4000 matrix generated in the first and second rounds) and a newly-added portion that indicates the interest levels of users 51-100 (represented by nodes 51-100) for items 4001-5000 (e.g., a 50×1000 matrix).

In some embodiments, the system can perform multiple rounds of computations until a pre-determined criterion is met (e.g., a convergence criterion which requires the numbers of iterations in two consecutive rounds of computations are substantially the same). In some embodiments, the number of rounds of computation can be determined by the number of computing groups. For example, the system can perform three rounds of computation in cases that three computing groups are involved. After the completion of computation, the system can then generate a collective result based on all of the (most) updated intermediate results. The collective result can be stored and transmitted as an output of the system for further processes (e.g., to provide item recommendations for users). Using the same example as discussed above, the system can generate a collective result based on the updated intermediate results from computing groups X, Y, and Z, and the collective result can be a rating number matrix (e.g., a 100×5000 matrix for items 1-100) that includes a portion from computing group X (e.g., a 10×5000 matrix for items 1-10), portion from computing group Y (e.g., a 40×5000 matrix for items 11-50), and a portion from computing group Z (e.g., a 50×5000 matrix for items 51-100).

In some embodiments, the intermediate results are not "rotated" or transmitted. Rather, they can be stored locally in the computing devices that originally generate them. In such embodiments, only items to be calculated are "rotated" from one computing group to another but not the intermediate results. The system can generate a collective result by combining or consolidating the intermediate results stored in the individual computing devices after all the computations are completed. In some embodiments, the system can rotate only a portion of the items and have the rest of the items remain in the originally-assigned computing groups (e.g., a hybrid model of item rotation).

In the foregoing and following descriptions, although directed graphs may be used for convenience of description, it is to be understood that other graph data structure can also be employed. Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Figure 1:
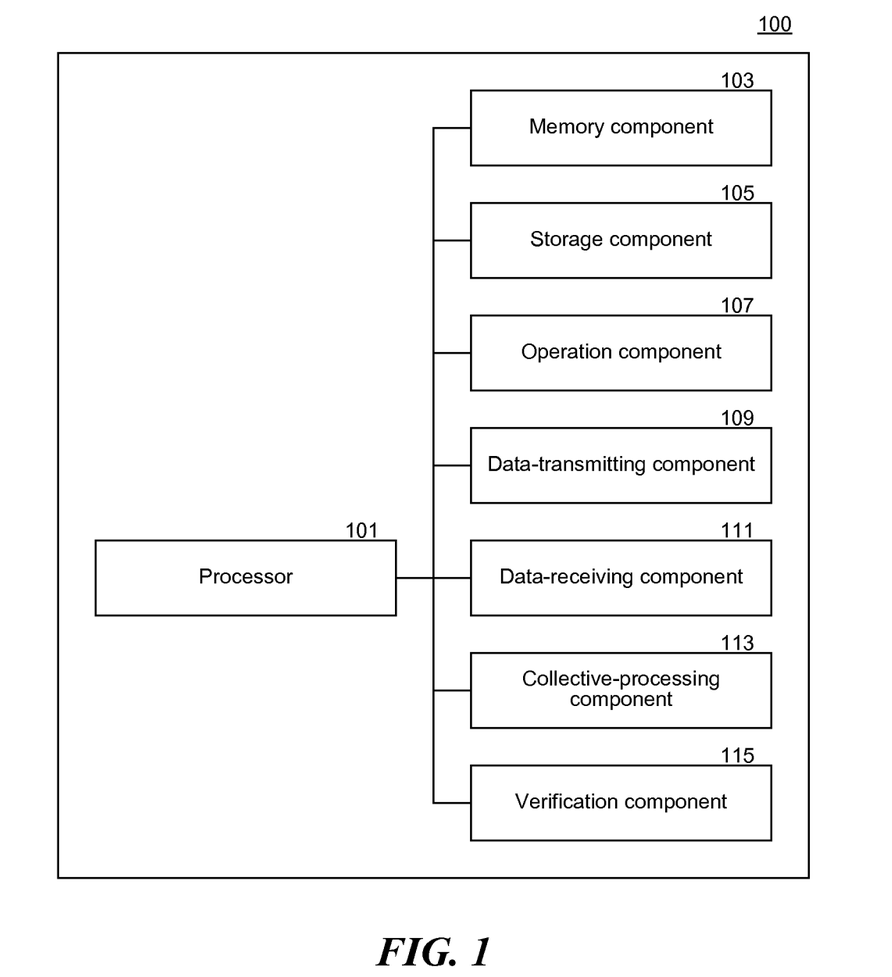
FIG. 1 is a block diagram illustrating a computing device in accordance with various embodiments of the present disclosure.

Several embodiments are described in more detail in reference to FIGS. 1-5. FIG. 1 is a block diagram illustrating a computing device 100 in accordance with various embodiments of the present disclosure. The computing device 100 can be used to perform a collaborative filtering analysis for a large number of nodes (e.g., representing multiple users in a social network) in a directed graph and various items (e.g., an object associated with or in the social network that a user of the network may be interested). In some embodiments, a system in accordance with the present disclosure can have more than two computing devices 100 so as to collectively perform the collaborative filtering analysis. The number of computing devices 100 in the system can be determined based on various factors, such as available computing resources, complexity of a directed graph, numbers of nodes in a directed graph, numbers of items to be analyzed, locality of data storage devices, locality of available computing devices, related data structures, overall system efficiency, and/or other suitable factors.

As shown in FIG. 1, the computing device 100 can include a processor 101, a memory component 103, a storage component 105, an operation/calculation component 107, a data-transmitting component 109, a data-receiving component 111, a collective-processing component 113, and a verification component 115. The processor 101 is coupled to other components and configured to control the same in the computing device 100. The memory component 103 is configured to temporarily store data to be processed and/or intermediate results during operation. The storage component 105 is configured to store data to be processed, intermediate results, overall results, device outputs, or other suitable information. In various embodiments, the storage component can be a distributed storage system. In various embodiments, the storage component can be a single storage device with multiple virtual partitions. In some embodiment, the computing device 100 can be implemented under a directed graph platform, such as Apache Giraph®, Apache Hive®, GraphLab® etc.

In the illustrated embodiment, the operation component 107 is configured to perform an operation between a node of a directed graph (e.g., representing a user in a social network) and an item (e.g., an object associated with or in the social network that a user of the network may be interested). In various embodiments, the operation can include solving an objective function to reach a solution. In some embodiments, the objective function can be an optimization equation, a linear or non-linear function, a regression equation, a statistical function, or other suitable objective functions. In some embodiments, the objective function can be solved by various approaches or algorithms, such as Stochastic Gradient Descent (SGD) algorithm, Alternating Least Squares (ALS) algorithm, etc. In some embodiments, the objective function can be solved by more than one algorithm in a set of computations (e.g., a hybrid model of algorithm). In various embodiments, the objective function can be solved to obtain a value or rating number that can represent a user's interest level in a specific item. In some embodiments, the rating numbers can be in a matrix form, such as a rating number matrix 200 shown in FIG. 2.

Referring to FIG. 2, the numerical numbers "1, 2, 3, 4 and 5" in the rating number matrix 200 indicate a user's interest level in a specific item. For example, User 1 has an interest level "4" in Item 1 and 3, an interest level "1" in Item 4, and an interest level "3" in Item 5. As shown in the rating number matrix 200, there is no rating number (indicated by a question mark "?") between User 1 and Item 2. However, the rating number matrix 200 indicates that User 2 has an interest level "3" in Item 2, User 3 has an interest level "1" in Item 2, and User 4 has an interest level "3" in Item 2. To obtain the rating number between User 1 and Item 2, the operation component 107 can perform an operation between User 1 and Item 2 by solving an objective function based on currently available rating numbers relating to User 1 (e.g., indicated as block 201 in FIG. 2) and Item 2 (indicated as block 203 in FIG. 2). In other embodiments, the numerical numbers "1, 2, 3, 4 and 5" can represent other information inferred from user interactions with the specific item, such as numbers of page visitations, comments, reviews, etc.

Referring back to FIG. 1, the data-transmitting component 109 can be configured to transmit data, commands, instructions, operated intermediate results (e.g., by the operation component 107) or other suitable information to other devices (e.g., another computing device). In the illustrated embodiment, the data-receiving component 111 can be configured to receive data, commands, instructions, updated intermediate results (e.g., updated by other computing devices used to perform the operation), or other suitable information to other devices (e.g., another computing device). (Details of data transmitting and receiving are discussed below.)

As discussed above, the system in accordance with the present disclosure can have more than two computing devices 100 to perform the collaborative filtering analysis. For example, the system can have 10000 computing devices to perform the collaborative filtering analysis. In the illustrated embodiment, the collective-processing component 113 is configured to generate a collective result by collecting intermediate results of the operation performed by each computing device 100 in the system. In some embodiments, however, the computing device 100 can function properly without the collective-processing component 113. In such embodiments, the collective result can be collected by other suitable computing devices or components.

In some embodiments, the computing device 100 can include a verification component 115 configured to verify the collective result generated by the collective-processing component 113 or to verify the intermediate result generated by the operation component 107. For example, the verification component 115 can verify the results based on suitable statistical data, empirical studies, prior results, proper tests (e.g., adding pseudo information for operation to see if the result makes sense or is consistent), etc. In some embodiments, the verification component 115 can generate a report to a system administrator, such as reporting an abnormal event. In some embodiments, the verification component 115 can generate or import testing or training data so as to verify the accuracy of the computations performed by the computing device 100.

Figure 3A:
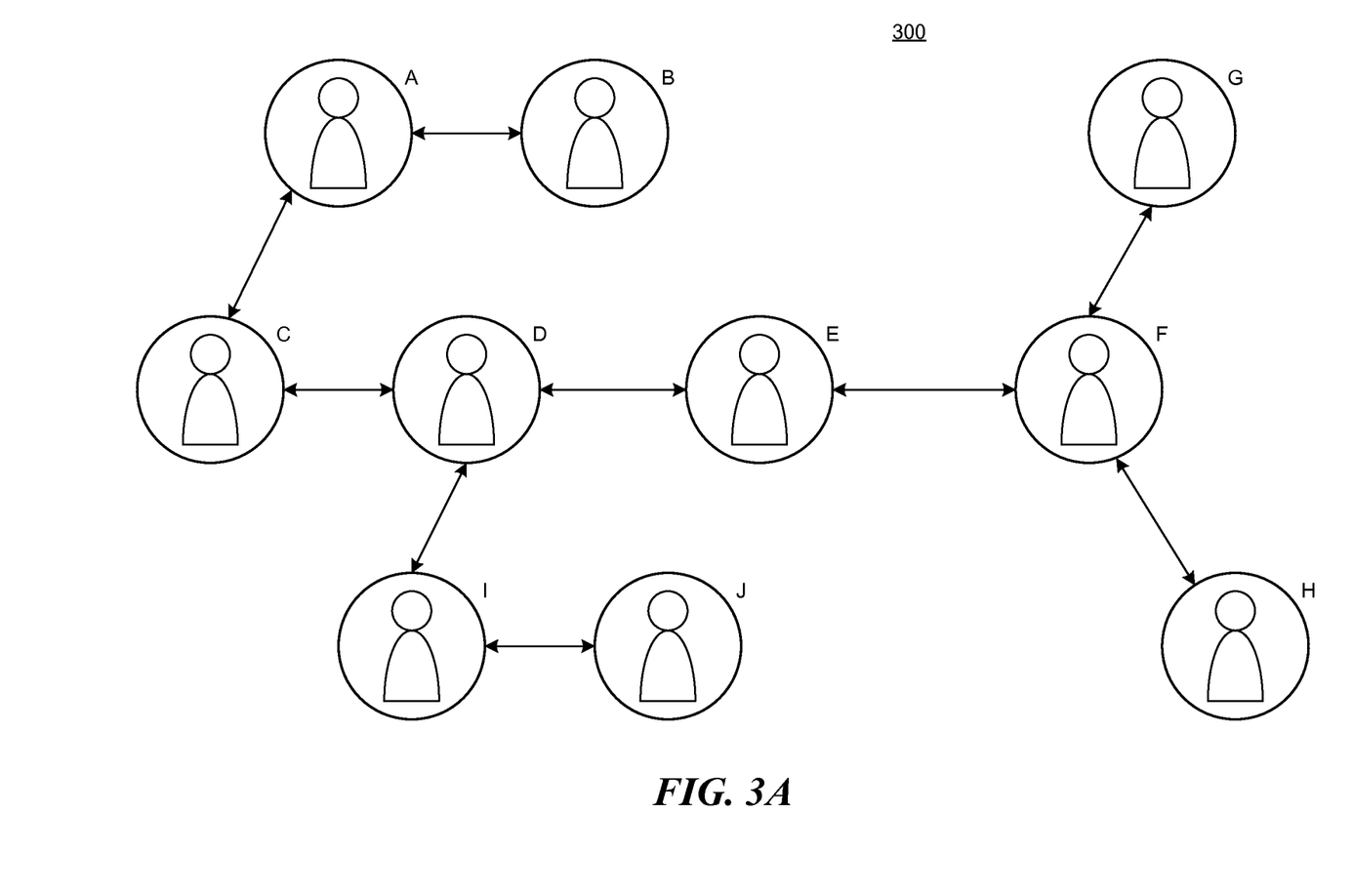
FIG. 3A is a schematic diagram illustrating a social directed graph in accordance with various embodiments of the present disclosure.
Figure 3B:
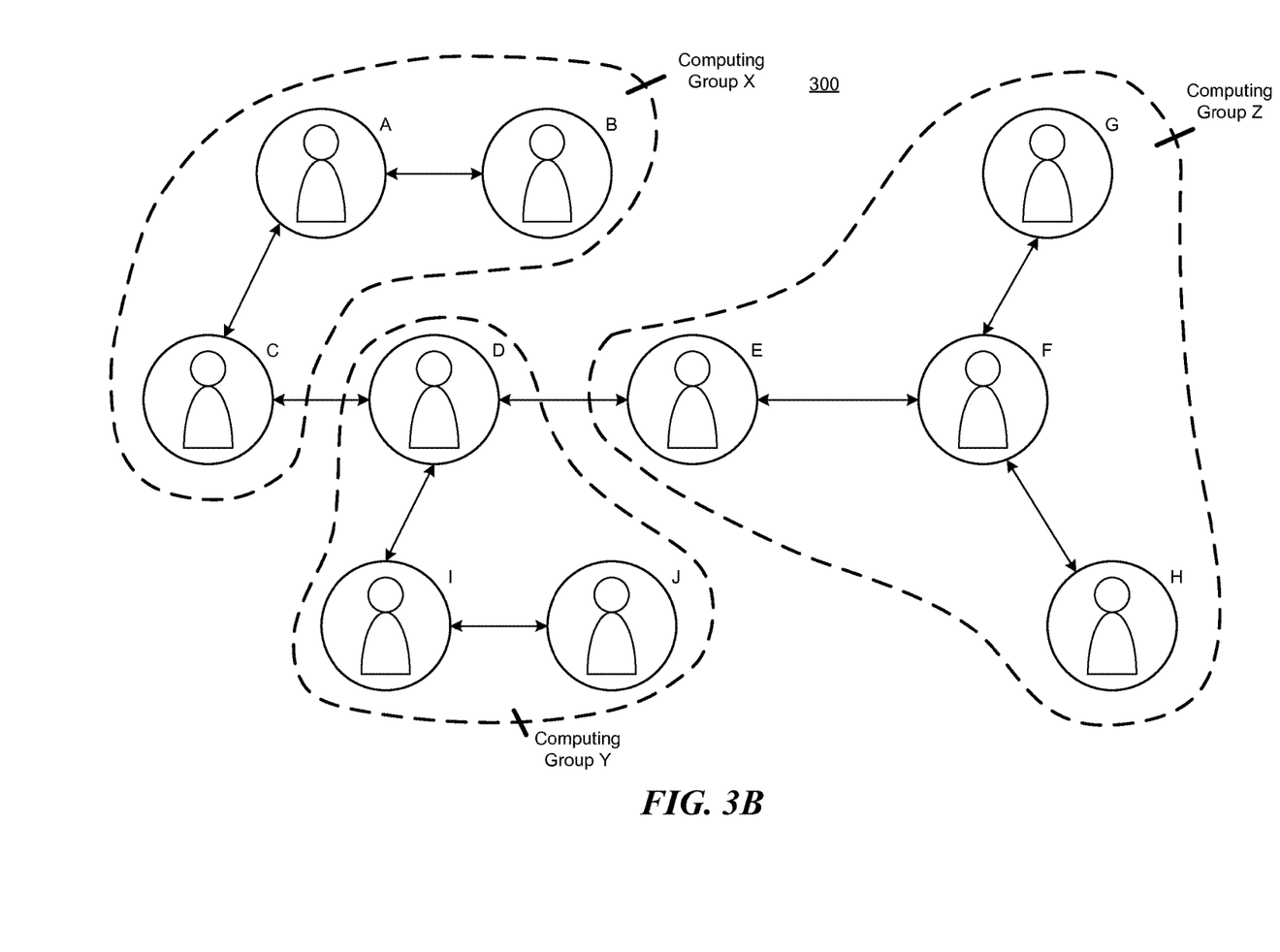
FIG. 3B is a schematic diagram illustrating the formation of computing groups of the social directed graph of FIG. 3A in accordance with various embodiments of the present disclosure.

FIGS. 3A and 3B illustrate a basic structure of a social directed graph 300 and how computing groups can be determined. FIG. 3A is a schematic diagram illustrating the social directed graph 300 in accordance with various embodiments of the present disclosure. As shown in FIG. 3A, the social directed graph 300 includes ten social network users A, B, C, D, E, F, G, H, I, and J, represented by nodes A, B, C, D, E, F, G, H, I, and J. Relationships among social network users A to J can be denoted by lines (e.g., edges) between two nodes (not all relationships are shown in FIG. 3A). For example, line AC (or direction vectors AC and CA) represents relationships (e. g., social network user A follows social network user C or social network user C tags social network user A as a close friend in a picture) between social network users A and C. FIG. 3B is a schematic diagram illustrating the formation of computing groups of the social directed graph 300 of FIG. 3A in accordance with various embodiments of the present disclosure. In the illustrated embodiment, the social directed graph 300 can be divided into three groups, namely computing groups X, Y, and Z. Computing group X can include nodes A, B, and C. Computing group Y can include nodes E, F, G, and H. Computing group Z can include nodes D, I, and J. As discussed above, factors to be considered when determining the computing groups include, for example, numbers of nodes in each computing group (e.g., each computing group can have a similar number of nodes), consumption of computing resources (e.g., each computing group can consume a similar amount of computing resources), physical or virtual locations of data storage (e.g., nodes stored in a same physical or virtual partition can be selected into a same computing group), availability of computing resources, various graph data structures, overall system efficiency, and/or other suitable factors.

Figure 4A:
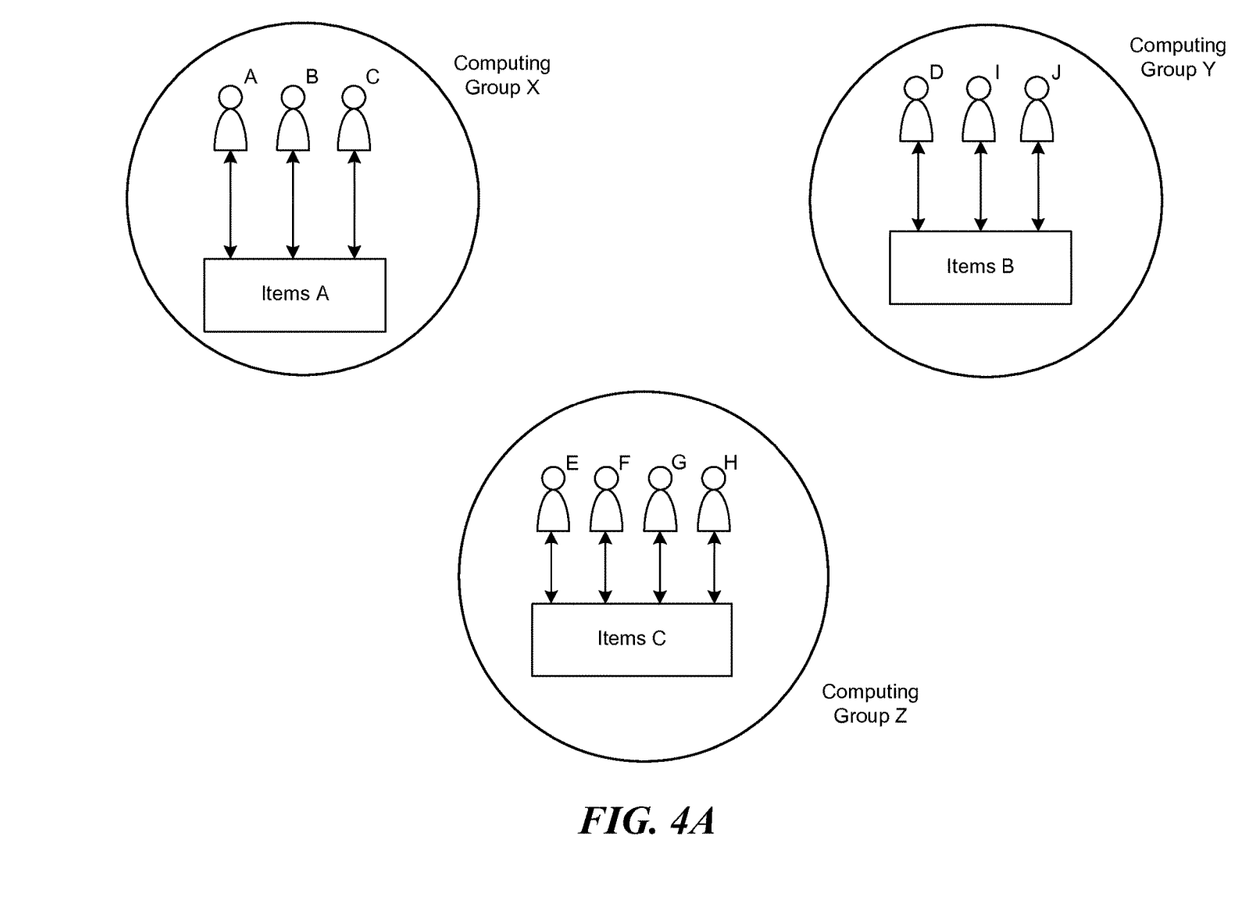
FIG. 4A is a schematic diagram illustrating assigning nodes and items in various computing groups and performing an operation between nodes and items in the computing groups in accordance with various embodiments of the present disclosure.
Figure 4B:
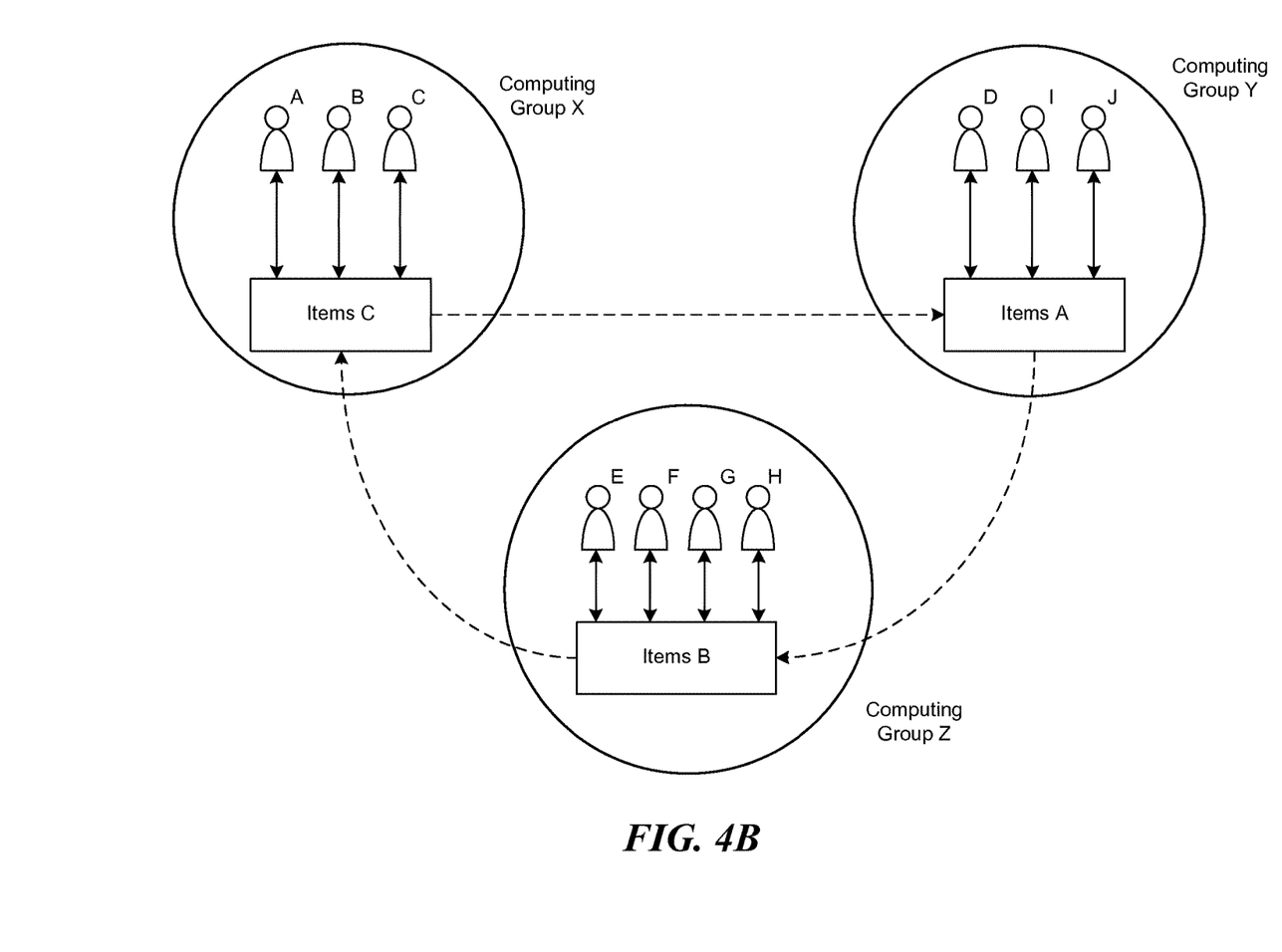
FIG. 4B illustrates performing the operation between nodes and items in the computing groups in a cyclic order in accordance with various embodiments of the present disclosure.
Figure 4C:
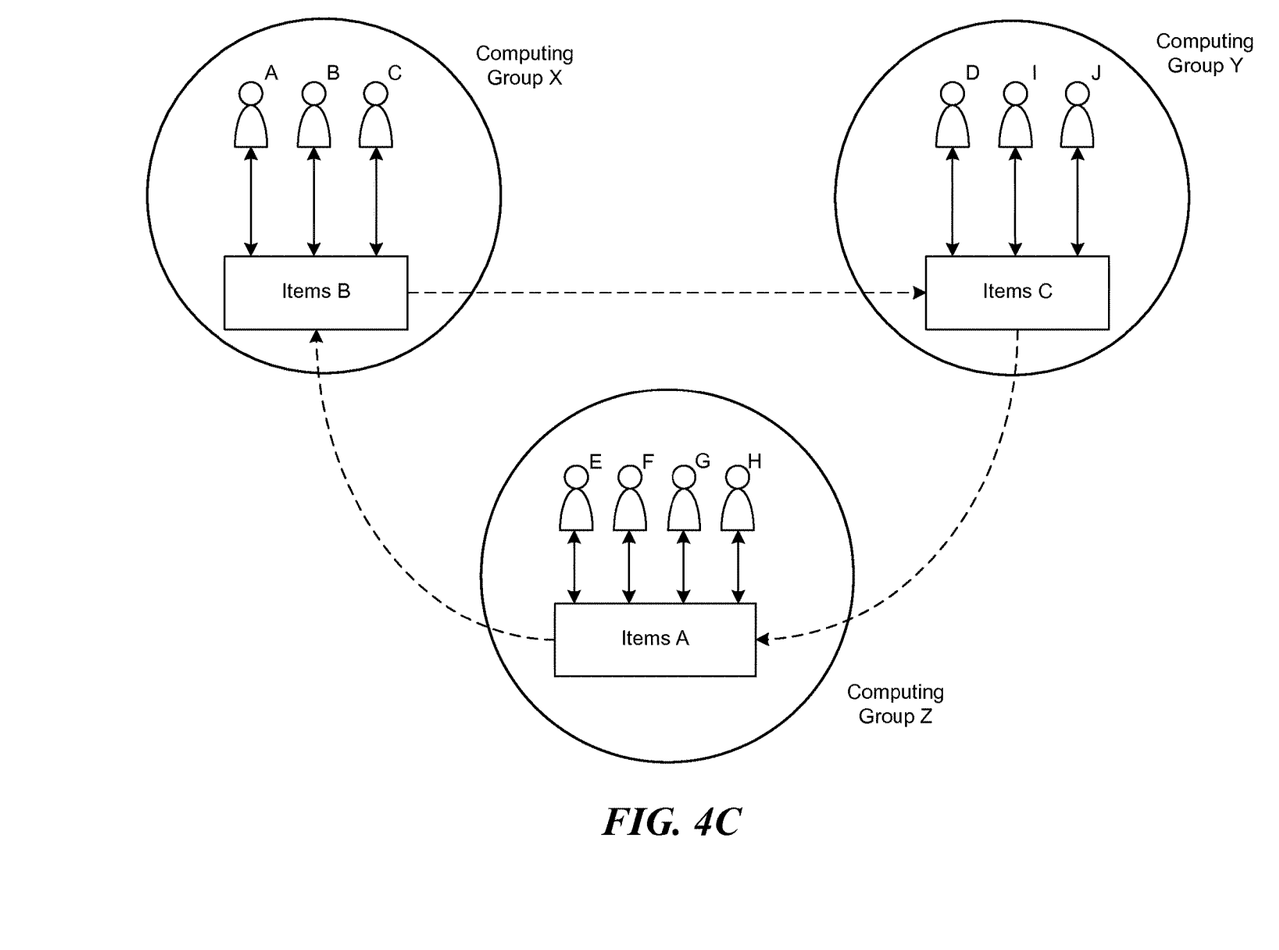
FIG. 4C further illustrates performing the operation between nodes and items in the computing groups in the cyclic order in accordance with various embodiments of the present disclosure.

FIGS. 4A-4C are schematic diagrams illustrating assigning nodes A, B, C, D, E, F, G, H, I, and J and items in computing groups X, Y, and Z and performing an operation between the nodes and items in a cyclic order in accordance with various embodiments of the present disclosure. As shown in FIG. 4A, social network users A, B, C, D, E, F, G, H, I, and J (represented by nodes A, B, C, D, E, F, G, H, I, and J in a directed graph) are assigned to computing groups X, Y, and Z. All the items to be analyzed can be divided into groups corresponding to the computing groups. Factors to be considered when assigning the items into groups include, for example, the characters of the items, (e.g., assigning items with similar characters to a same group), available computing resources (e.g., assigning more items to a group corresponding to a computing device with more computing resources), locality of data storage devices used to store the items, the total numbers of items, related data structures, overall system efficiency, and/or other suitable factors. In some embodiments, the items can be stored as "worker data" in various computing devices corresponding to the computing groups. In some embodiments, the "worker data" can include any form of data that can be properly calculated, operated, updated, and stored by the computing device 100. In some embodiments, the format of the "worker data" corresponds to the configuration or types of the computing device 100. Examples of the "worker data" can include "intermediates results" or "items" to be analyzed described throughout the present disclosure.

After properly assigning social network users A, B, C, D, E, F, G, H, I, and J and the items to be analyzed, the system can start to perform an operation (e.g., solving an objective function by an algorithm) between each node and each item assigned in the same computing groups (e.g., a first round of operation). For example, in computing group X, the system performs the operation between each item assigned in Items A and users A, B, and C, respectively (indicated by solid arrows shown in FIG. 4A). Similarly, in computing group Y, the system performs the operation between each item assigned in Items B and users D, I, and J, respectively, while in computing group Z, the system performs the operation between each item assigned in Items C and users E, F, G, and H, respectively. For each item group (e.g., Items A, Items B, and Items C), the corresponding operations can generate intermediate results which can be stored in corresponding computing devices.

After finishing the operations for each computing group, the system can "rotate" the item groups with the corresponding stored intermediate results in a cyclic order (indicated by dashed arrows shown in FIG. 4B). In the embodiment illustrated in FIG. 4B, the cyclic order is a clockwise cyclic order. For example, Items A (with corresponding stored intermediate results) is transmitted from computing group X to computing group Y, Items B (with the corresponding stored intermediate results) is transmitted from computing group Y to computing group Z, and Items C (with the corresponding stored intermediate results) is transmitted from computing group Z to computing group X. After the rotation, the system continues to perform a next (or second) round of operation between each user and item in the same computing group. For example, in computing group Y, the system performs the operation between each item assigned in Items A and users D, I, and J, respectively (indicated by solid arrows shown in FIG. 4B). Similarly, in computing group Z, the system performs the operation between each item assigned in Items B and users E, F, G, and H, respectively, while in computing group X, the system performs the operation between each item assigned in Items C and users A, B, and C, respectively.

For each item group, in addition to the existing intermediate results, the corresponding operations can generate additional intermediate results. The existing intermediate results and the additional intermediate results can together form updated intermediate results. For example, the existing intermediate results for Items A can be the intermediate results generated in computing group X back in the first round of operation, and the additional intermediate result can be those generated in computing group Y in the second round of operation. Accordingly, the updated intermediate result for Items A can include the existing intermediate results generated in computing group X for Items A and the additional intermediate results generated in computing group Y for Items A.

As shown in FIG. 4C, after completing the second round of operation, the system can further "rotate" the item groups with the corresponding stored intermediate results in the cyclic order. For example, Items A (e.g., with the corresponding stored intermediate results) is transmitted from computing group Y to computing group Z, Items B (e.g., with the corresponding stored intermediate results) is transmitted from computing group Z to computing group X, and Items C (e.g., with the corresponding stored intermediate results) is transmitted from computing group X to computing group Y. After the rotation, the system continues to perform another (or a third) round of operation between each user and item in the same computing group. For example, in computing group Z, the system performs the operation between each item assigned in Items A and users E, F, G, and H, respectively (indicated by solid arrows shown in FIG. 4C). Similarly, in computing group X, the system performs the operation between each item assigned in Items B and users A, B, and C, respectively, while in computing group Y, the system performs the operation between each item assigned in Items C and users D, I, and J, respectively. For each item group, in addition to the existing intermediate results, the corresponding operations can generate additional intermediate results. The existing intermediate results and the additional intermediate results can together form updated intermediate results, as discussed above with reference to FIG. 4B.

In the embodiments illustrated in FIGS. 4A-4C, the whole process is completed after three rounds of operation. The system can then generate a collective result based on the updated intermediate results for each item group and then transmit the collective result as an output of the system. For example, the output can include the operation results between each of the users A, B, C, D, E, F, G, H, I, and J and each of the items to be analyzed (e.g., all items in Items A, Items B, and Items C). In some embodiments, the output can be in a matrix form similar to the rating number matrix 200 shown in FIG. 2.

Figure 5:
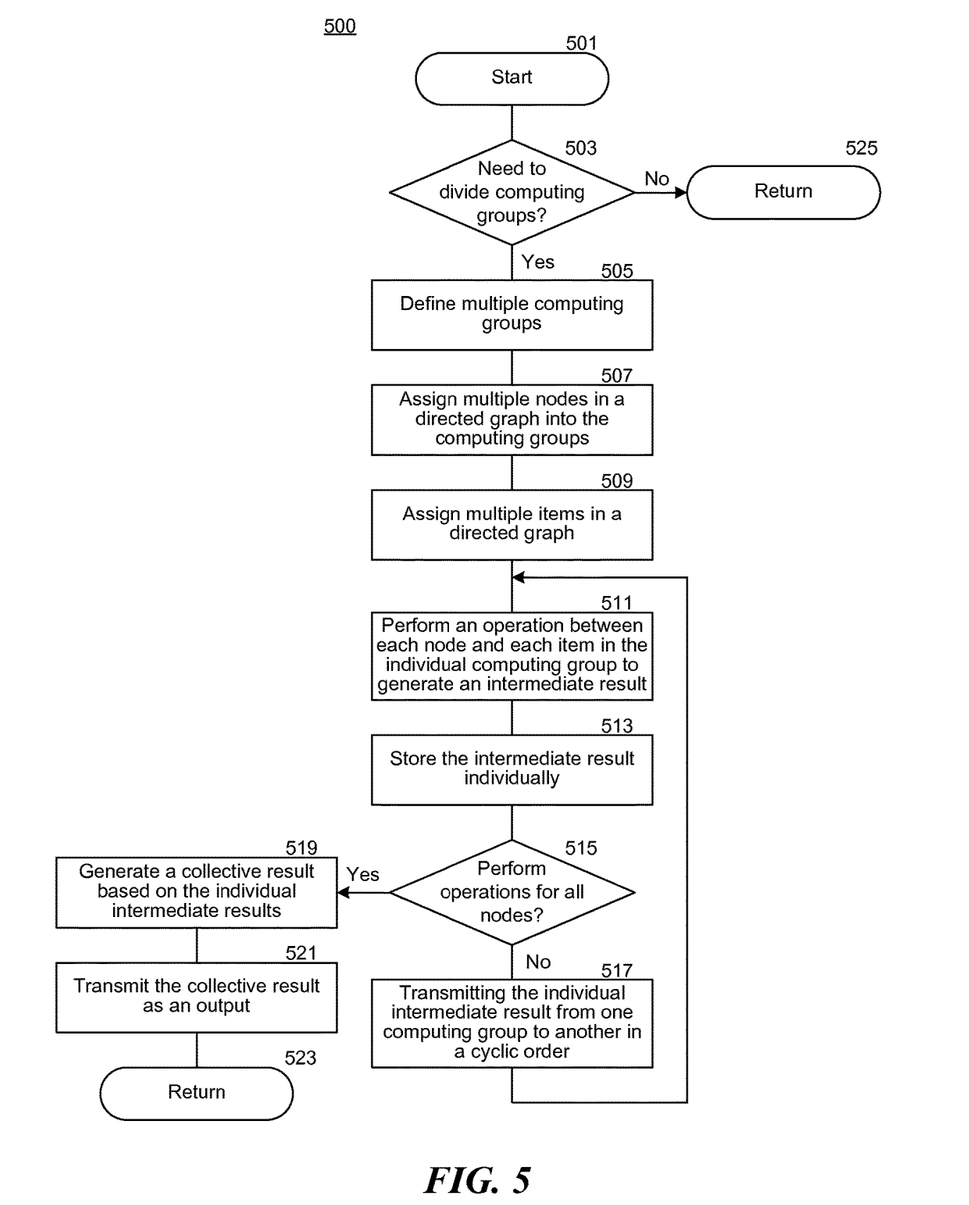
FIG. 5 is a flow diagram illustrating a routine for implementing a method of collaborative filtering by a directed graph in accordance with various embodiments of the present disclosure.

FIG. 5 is a flow diagram illustrating a routine 500 for implementing a method of collaborative filtering by a directed graph in accordance with various embodiments of the present disclosure. The system in accordance with the present disclosure can initial the routine 500 at block 501. The routine 500 then continues to decision block 503 to determine whether dividing computing groups for performing operations for the nodes of the directed graph and multiple items to be analyzed is warranted. If not, then the routine 500 ends at block 525. If so, then the routine 500 proceeds to block 505 to define multiple computing groups.

In some embodiments, the computing groups can be determined based on various factors such as, relationships among the nodes/items (e.g., assigning nodes with close relationships to a same group, or assigning items with a same format or attribute to a same group), available computing resources (e.g., assigning more nodes/items to a computing device that have more computing resources), locality of data storage devices, the total numbers of nodes/items, related data structures, overall system efficiency, and/or other suitable factors.

At block 507, the system can assign multiple nodes of the directed graph into the defined computing groups. In some embodiments, the system can associate the defined computing groups with corresponding computing devices. A block 509, the system can assign the multiple items to be analyzed into the defined computing groups. The factors to be considered when assigning the items to be analyzed are discussed above. At block 511, the system starts to perform an operation between each node and each item in the individual computing group to generate an intermediate result. In some embodiments, the operation includes calculating a solution of an objective function. At block 513, the system individually stores the generated intermediate result in the multiple computing devices corresponding to the computing groups.

The routine 500 then continues to decision block 515 to determine whether the system completes all the operations (e.g., operations between each of the nodes and each of the items). If not, then the process continues to block 517. For example, the system can only complete a first round of operation out of three founds of operation. At block 517, the system then transmits the individual intermediate results from one computing group to another computing group in a cyclic order. For example, the system can "rotate" the individual intermediate results as described above with reference to FIGS. 4A-4C. The routine 500 then proceeds back to block 511 for another round of operation. At decision block 515, if the system completes all the operations, then the routine 500 moves to block 519 to generate a collective result based on the individual intermediate results. At block 521, the system can transmit the collective result as a system output. The routine 500 then returns at block 523. Persons having ordinary skills in the art would appreciate that the logic illustrated in FIG. 5 and described above can be altered in a variety of ways. For example, the order of the logic can be rearranged, certain steps can be performed in parallel, illustrated logic can be omitted, other logic can be included etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the present disclosure is not limited except as by the appended claims.

We claim:

1. A computer-implemented method, at least a portion of the method being performed by a collaborative filtering computing system comprising at least a first computing device and a second computing device, the method comprising:

accessing, by the computing system, a data structure representing a bipartite graph comprising a first plurality of nodes representing users and a second plurality of nodes representing a plurality of items, wherein the first plurality of nodes is interconnected with the second plurality of nodes by a plurality of edges representing a direct relationship between a specific user and a specific item;

selecting, by the computing system, a first set of nodes from the first plurality of nodes to organize a first computing group, the first set of nodes being selected based on a relationship between at least two nodes within the first set of nodes;

selecting, by the computing system, a second set of nodes from the first plurality of nodes to organize a second computing group, wherein the first and second sets of nodes are selected at least based on computing resources allocated to perform a computation, the second set of nodes being selected based on a relationship between at least two nodes within the second set of nodes;

associating, by the computing system, the first computing group to a first computing device;

associating, by the computing system, a first set of items represented by a first portion of the second plurality of nodes with the first computing device;

associating, by the computing system, the second computing group to a second computing device;

associating, by the computing system, a second set of items represented by a second portion of the second plurality of nodes with the second computing device;

performing, by the first computing device, the computation between each node of the first set of nodes and each item of the first set of items to generate a first intermediate result comprising a first rating matrix representing an interest level between each node of the first set of nodes and each item of the first set of items;

performing, by the second computing device, the computation between each node of the second set of nodes and each item of the second set of items to generate a second intermediate result comprising a second rating matrix representing an interest level between each node of the second set of nodes and each item of the second set of items;

storing, by the first computing device, the first intermediate result in the first computing device;

storing, by the second computing device, the second intermediate result in the second computing device;

receiving, at the second computing device, the first intermediate result;

receiving, at the first computing device, the second intermediate result;

performing, by the second computing device, the computation between each node of the first set of nodes and each item of the second set of items to generate an updated first intermediate result, wherein the updated first intermediate result comprises a third rating matrix representing an interest level between each node of the first set of nodes and each item of the first and second sets of items;

performing, by the first computing device, the computation between each node of the second set of nodes and each item of the first set of items to generate an updated second intermediate result, wherein the updated second intermediate result comprises a fourth rating matrix representing an interest level between each node of the second set of nodes and each item of the first and second sets of items;

generating, by the computing system, a collective result at least based on the updated first and second intermediate results; and saving, by the computing system, a prediction of a behavior of the plurality of users based on the collective result.

2. The method of claim 1, wherein performing the computation includes calculating a solution of an objective function.

3. The method of claim 1, wherein the plurality of users are users in a social network.

4. The method of claim 3, wherein the first set of nodes are selected at least based on a first user of the social network following a second user of the social network.

5. The method of claim 1, wherein the first set of items are associated based on users having a common interest in items of the first set of items.

6. The method of claim 5, wherein the interests are represented by multiple rating numbers, and wherein the multiple rating numbers are associated with one or more factors including page-visitations, comments, and reviews by the users in the social network.

7. The method of claim 1, wherein performing the computation includes calculating a solution of an objective function by a stochastic gradient descent (SGD) algorithm.

8. The method of claim 1, wherein performing the computation includes calculating a solution of an objective function by an alternating least squares (ALS) algorithm.

9. The method of claim 1, wherein:
receiving, at the second computing device, the first intermediate result further includes:
transmitting the first intermediate result to a third computing group having a third set of nodes selected from the first plurality of nodes;
performing the computation between each node of the third set of nodes and each item of the first set of items;
updating the first intermediate result; and
transmitting the first intermediate result to the second computing device.

10. The method of claim 1, wherein:
receiving, at the first computing device, the second intermediate result further includes:
transmitting the second intermediate result to a third computing group having a third set of nodes selected from the first plurality of nodes;
performing the computation between each node of the third set of nodes and each item of the second set of items;
updating the second intermediate result; and
transmitting the second intermediate result to the first computing device.

11. A computer-implemented method, at least a portion of the method being performed by a collaborative filtering computing system comprising at least at least three computing devices, the method comprising:

accessing, by the computing system, a bipartite graph comprising a first plurality of nodes representing users and a second plurality of nodes representing a plurality of items, wherein the first plurality of nodes is interconnected with the second plurality of nodes by a plurality of edges representing a direct relationship between a specific user and a specific item;

determining, by the computing system, more than two computing groups at least based on computing resources allocated to perform an operation, wherein the more than two computing groups are respectively associated with more than two computing devices;

assigning, by the computing system, a plurality of sets of nodes of the first plurality of nodes to the more than two computing groups, wherein a set of nodes of the first plurality of nodes are assigned at least based on a relationship between two nodes of the first plurality of nodes;

assigning, by the computing system, sets of multiple items from the plurality of items to the more than two computing groups;

performing, at each of the more than two computing devices, the operation between each node of the corresponding computing group and each item of the corresponding computing group so as to form an intermediate result, wherein the intermediate result at each of the more than two computing devices comprises a rating matrix representing an interest level between each node of the corresponding computing group and each item of the corresponding computing group;

storing, at each of the more than two computing devices, the intermediate result;

transmitting the intermediate result from one computing device to another computing device in a cyclic order;

updating the intermediate result by performing, at each of the more than two computing devices, the operation between each node of the corresponding computing group and each item of a different computing group transmitted by a different computing device to obtain an updated intermediate result comprising a rating matrix representing an interest level between each node of the computing group and each item of the computing group and of different computing group;

repeating the storing step, the transmitting step, and the updating step until the operation between each item of the plurality of items and each node of the first plurality of nodes of the bipartite graph has been completed;

generating, by the computing system, a collective result at least based on the intermediate result from each of the more than two computing devices; and saving, by the computing system, a prediction of a behavior of the plurality of users based on the collective result.

12. The method of claim 11, wherein performing the operation includes calculating a solution of an objective function.

13. The method of claim 11, wherein the plurality of users are users in a social network.

14. The method of claim 13, wherein the set of nodes of the first plurality of nodes represent multiple users having a common interest in an item.

15. The method of claim 14, wherein the common interest is represented by multiple rating numbers, and wherein the multiple rating numbers are associated with one or more factors including page-visitations, comments, and reviews by the multiple users in the social network.

16. The method of claim 11, wherein performing the operation includes calculating a solution of an objective function with a SGD algorithm.

17. The method of claim 11, wherein performing the operation includes calculating a solution of an objective function with an ALS algorithm.

18. A collaborative filtering computing system, comprising:
at least two computing devices, each computing device comprising:
a processor;
computer readable storage memory coupled to the processor storing computer instructions configured to:
access a portion of a data representation of a bipartite graph comprising a first plurality of nodes representing users and a second plurality of nodes representing a plurality of items, wherein the first plurality of nodes is interconnected with the second plurality of nodes by a plurality of edges representing a relationship between a specific user and a specific item, wherein the portion of the data representation includes a selected number of nodes of the first plurality of nodes and a set of information corresponding to a set of items of the plurality of items, wherein the selected nodes are selected at least based on relationship between two nodes of the first plurality of nodes;
perform an operation between each item of the set of items and each node of the selected number of nodes to form the set of information;
transmit the set of information;
receive an updated set of information, wherein the updated set of information is updated by performing the operation between each item of the set of items and an unselected group of nodes of the first plurality of nodes;
generate a predicted behavior of each of the users associated with the selected number of nodes based on the updated set of information.

19. The system of claim 18, wherein the computer instructions are further configured to verify the updated set of information.

20. The system of claim 18, wherein:
the operation is a calculation of a solution of an objective function;
the relationship between two nodes comprises users having an interest in multiple items; and
the interests are represented by multiple rating numbers in the collective result, wherein the multiple rating numbers are associated with one or more factors including page-visitations, comments, and reviews by the users.

* * * * *